(Model.)

A. C. BALL & B. H. TRIPP.
CHURN.

No. 271,566. Patented Jan. 30, 1883.

Witnesses.
Inventors.

UNITED STATES PATENT OFFICE.

ALONZO C. BALL AND BENJAMIN H. TRIPP, OF GALLATIN, MISSOURI.

CHURN.

SPECIFICATION forming part of Letters Patent No. 271,566, dated January 30, 1883.

Application filed June 20, 1882. (Model.)

*To all whom it may concern:*

Be it known that we, ALONZO C. BALL and BENJAMIN H. TRIPP, of Gallatin, in the county of Daviess and State of Missouri, have invented certain new and useful Improvements in Churns; and we do hereby declare the following to be a full, clear, and exact description of the invention, such as will enable others skilled in the art to which it pertains to make and use it, reference being had to the accompanying drawings, which form part of this specification.

Our invention relates to an improvement in churns; and it consists in the combination of a swinging body, upon which the churn is placed, in combination with suitable levers for operating the churn-dasher as the body is swung back and forth, as will be more fully described hereinafter.

The object of our invention is to provide a machine by means of which churning can be easily and rapidly done, and in which the cream is made to dash back and forth in the churn-body at the same time that the dasher is made to play up and down through it.

Figure 1:
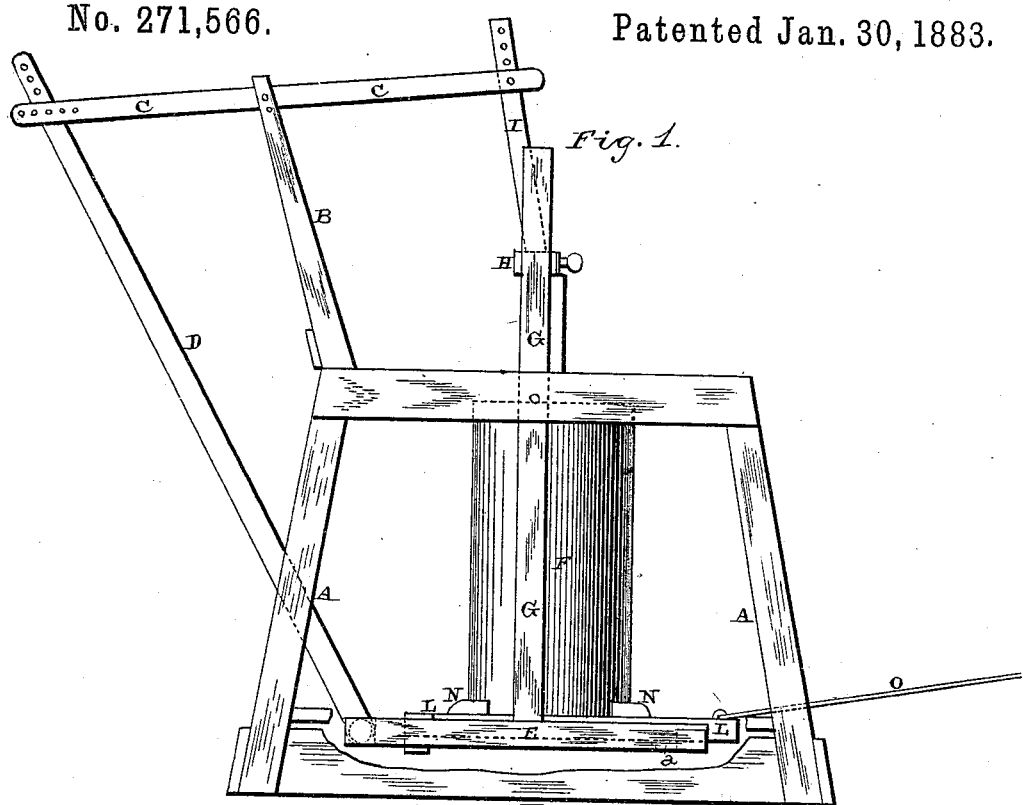
Figure 2:
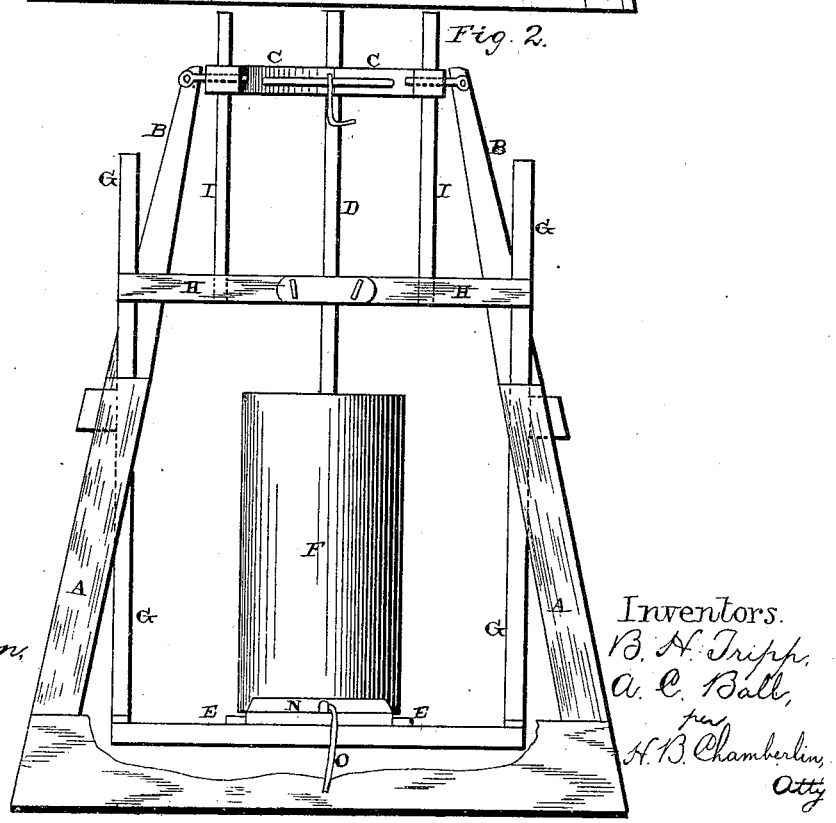

Figure 1 is a side elevation of our invention complete. Fig. 2 is a front view of the same.

A represents a suitable frame, which is made slightly narrower at the top than at the bottom, and which has the upper ends of the two rear standards, B, to project a suitable distance above the top of the frame, as shown. Pivoted in between the upper ends of these extensions is the lever C, which has its front end formed into two prongs, and which has its rear end slotted and a series of holes made through it, so that the connecting-rod D can be adjusted back and forth therein, according to the length of the stroke which it is desired to give to the churn-dasher. The upper end of this connecting-rod D also has a series of holes through it, so as to render the adjustment much easier, and which has its lower end connected to the swinging frame E, upon which the churn F is placed. This swinging frame is made rectangular, and is secured rigidly to the lower end of the pivoted rods G, which extend a suitable distance above the top of the frame A at their upper ends. These rods are pivoted inside of the frame A and allow the frame to swing freely back and forth, carrying the churn with it. The upper ends of the rods serve as guides upon which the cross-head H, which is connected to the front end of the pivoted lever C, by means of the connecting-rods I. The upper ends of these connecting-rods are provided with a series of holes, so that they can be adjusted upon the ends of the lever, and thus regulate the length of stroke that is required for the dasher. As this cross-head slides back and forth upon the pivoted rods, and as the dasher-rod is clamped securely to this head, the dasher-rod is always in a direct line with the churn-body, which moves back and forth with the pivoted rods, and is always in a line with them.

The churn is placed upon a sliding board, L, which has suitable flanges, N, formed upon its top, so as to catch against the lower edges of the churn-body, and thus prevent the body from becoming displaced. To the outer end of this board, which slides freely back and forth in the swinging frame, is attached the operating rod or handle O, by means of which the carriage is made to swing freely back and forth. When the churn is to be placed upon the swinging frame this sliding board is first drawn outward, so that its outer end extends beyond the front side of the frame, when the churn can be easily and conveniently placed in position. After the churn has been made to catch behind the flanges on the top of the board, the board is pushed back into position until the cleat a, which extends across its under side, near its front end, is made to catch behind the front cross-piece of the frame, and then, after the dasher has been inserted in the churn and its upper end clamped to the cross-head, the churn is ready for operation. The length of the stroke of the dasher will of course be regulated by the amount of cream in the churn. When the pivoted frame is made to swing back and forth by the operator the cream is dashed back and forth in the body of the churn at the same time that the dasher is worked up and down through it, and thus the cream is operated upon both by its dashing movement and by the dasher.

Having thus described our invention, we claim—

The combination of the swinging frame E, connecting-rod D, lever C, rods I, cross-head H, and pivoted rods or levers G, the churn-dasher being clamped to the cross-head H, substantially as shown and described.

In testimony whereof we affix our signatures in presence of two witnesses.

ALONZO C. BALL.
B. H. TRIPP.

Witnesses:
T. B. YATES,
L. P. DE HART.